Aug. 26, 1941.    B. NEWBERRY    2,253,803
GAUGE
Filed Dec. 6, 1940
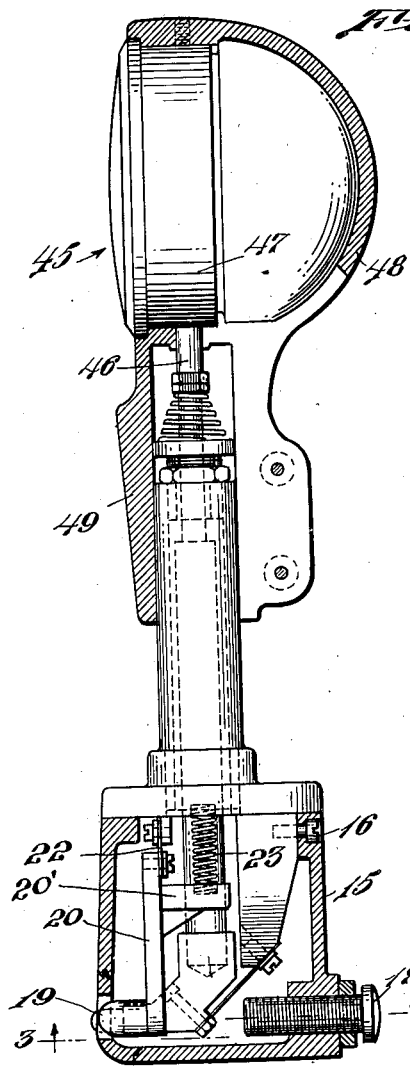
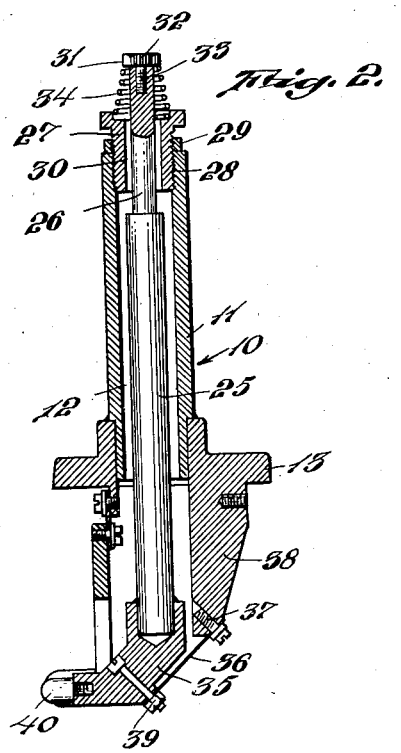
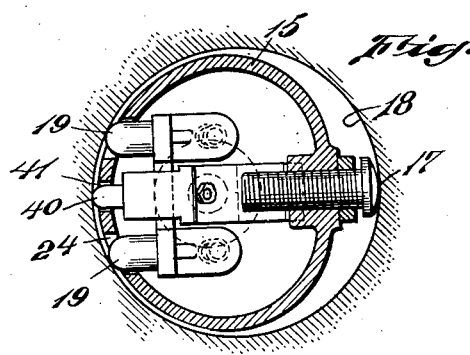
INVENTOR.
Barnes Newberry
BY Barlow & Barlow
ATTORNEYS.

Patented Aug. 26, 1941

2,253,803

UNITED STATES PATENT OFFICE 2,253,803

GAUGE

Barnes Newberry, Narragansett, R. I., assignor to Federal Products Corporation, a corporation of Rhode Island Application December 6, 1940, Serial No. 368,826

6 Claims. (Cl. 33—172)

This invention relates to a gauge and has for one of its objects to mechanically transmit motion from a feeler finger to a remote location without two parts sliding one in contact with the other.

Another object of the invention is to do away with a bellows which has heretofore been utilized for the purpose of mounting a rod for transmitting motion from the feeler finger to the dial gauge and provide a more durable mounting for the rod.

Another object of the invention is to provide a spring to replace a more fragile bellows for a rod mounting on the gauge.

Another object of the invention is to provide a complete spring mounting of the rod for transmission of movement from the feeler finger to the dial indicator.

Another object of the invention is to provide for adjustment of the spring for the mounting of one end of the transmission rod that the required tension on the spring may be provided and the position of the rod determined.

With these and other objects in view, the invention consists of certain novel features of construction, as will be more fully described, and particularly pointed out in the appended claims.

In the accompanying drawing:

Fig. 1 is a central sectional view of a bore gauge complete;

Fig. 2 is a sectional view of certain of the operating parts of the gauge; and

Fig. 3 is a section on line 3—3 of Fig. 1.

A rod for transmission of motion from a feeler finger of a bore gauge to the dial is mounted in the body of a bore gauge, and has heretofore been supported at its upper end by a bellows. This bellows is found to become easily stretched if struck by reason of parts thereof being moved beyond their elastic limit; and in order to avoid the difficulties experienced by the use of such bellows, I have mounted a spring to take the place of this bellows by which the rod for transmission of motion from the feeler finger to the dial gauge becomes entirely spring mounted and may withstand shocks and jars without any of the parts being stretched beyond their elastic limit, and thus, a better arrangement of the parts is provided; and the following is a more detailed description of the present embodiment of this invention, illustrating the preferred means by which these advantageous results may be accomplished:

With reference to the drawing, 10 designates generally the body of the gauge consisting of a tubular portion 11, hollow as at 12, and flanged as at 13 to receive a casing 15 secured thereto by bolts 16. This casing is provided with an adjustable contact stud 17 to engage one point in the bore 18 (see Fig. 3) in which it may be placed, while spaced contact members 19 are carried by an arm 20 and hingedly mounted by a leaf spring 22 and forced outwardly through the openings 24 in the casing 15 by spring 23 acting on abutment 20' to contact other portions of the bore 18 and assist in centralizing the gauge in the bore.

A rod 25 is located in the hollow tubular body shown in Fig. 2 and is reduced as at 26 to extend through the adjustable collar 27 which is threaded as at 28 into the upper end of the tubular portion 11, and is held in adjusted position by a clamping nut 29. The opening 30 through this nut allows a substantial clearance for the reduced portion 26 of the rod 25. An abutment 31 is provided by means of the nut 32 threaded as at 33 to the upper end of the reduced portion 26 and a spring 34 engages beneath this nut 32 and the upper end of the collar 27 so as to resiliently support the rod 25 at its upper end and yet permit downward and rocking movement thereof.

A foot 35 is secured to the lower end of the rod 25, and this foot is hinged by a leaf spring plate 36 secured as at 37 to the downwardly-extending portion 38 of the body and also secured as at 39 to the foot 35. This foot carries a feeler finger or contact member 40 which extends through an opening 41 in the casing 15 and is located diametrically opposite to the contact 17 so that measurement of the bore 18 will occur along a diametrical line. As the feeler finger is moved inwardly or outwardly, it swings by reason of hinge 36 and moves the rod 35 correspondingly; that is, as the feeler finger 40 moves inwardly, the rod 25 moves downwardly.

A dial gauge designated generally 45 has its plunger 46 extending from its casing 47 in its housing 48, which housing has a clamp sleeve 49 to embrace the tubular body 11 and cause its plunger 46 to engage the head 32 of the rod 25. This plunger will be under compression by a spring within the dial casing 47 tending to move downwardly, and as the finger 40 is moved inwardly to move the rod 25 downwardly, this plunger 46 will follow the rod 25 and thus by reason of the hand in the indicator will show the amount of movement that this rod has traveled.

By reason of spring mounting of the rod 25, little or no damage occurs by reason of blows which might suddenly occur upon the feeler finger, and no wearing of parts will occur by sliding of one part upon the other, which sometimes detrimentally affects a gauge and provides a source of trouble in gauging instruments.

I claim:

1. In a gauge, a tubular body, a rod centrally located in the hollow body and out of contact therewith and provided with an abutment at its end, a spring encircling said rod and engaging said abutment at one end, and means supporting the other end of said spring on said tubular body, said spring being adapted to centralize and resiliently mount said rod in said body.

2. In a gauge, a tubular body, a rod centrally located in the hollow body and out of contact therewith and provided with an abutment at its end, a spring encircling said rod and engaging said abutment at one end, and means supporting the other end of said spring on said tubular body, said spring being adapted to centralize and resiliently mount said rod in said body, a feeler foot secured to the other end of said rod, and means for resiliently connecting said foot to said body.

3. In a gauge, a tubular body, a rod centrally located in the hollow body and out of contact therewith and provided with an abutment at its end, a spring encircling said rod and engaging said abutment at one end, and means supporting the other end of said spring on said tubular body, said spring being adapted to centralize and resiliently mount said rod in said body, a feeler foot secured to the other end of said rod, and a resilient leaf spring for hingedly connecting said rod to said body whereby said rod is spring supported at its opposite ends.

4. In a gauge, a tubular body, a rod centrally located in the hollow body and out of contact therewith and provided with an abutment at its end, an adjustable nut in the end of said body, and a spring encircling said rod and engaging said abutment at one end and said nut at its opposite end to centralize and resiliently mount said rod in said body.

5. In a gauge, a tubular body, a rod centrally located in the hollow body and out of contact therewith and provided with an abutment at its end, an adjustable nut in the end of said body, a spring encircling said rod and engaging said abutment at one end and said nut at its opposite end to centralize and resiliently mount said rod in said body, a feeler foot secured to the other end of said rod, and means for resiliently connecting said foot to said body.

6. In a gauge, a tubular body, a rod centrally located in the hollow body and out of contact therewith and provided with an abutment at its end, an adjustable nut in the end of said body, a spring encircling said rod and engaging said abutment at one end and said nut at its opposite end to centralize and resiliently mount said rod in said body, a feeler foot secured to the other end of said rod, and a resilient leaf spring for hingedly connecting said rod to said body whereby said rod is spring supported at its opposite ends.

BARNES NEWBERRY.